March 7, 1967  H. F. MISEROCCHI  3,307,266
METHOD AND APPARATUS FOR MEASURING THE THICKNESS
OF A LAMINAR LAYER
Filed March 11, 1965  2 Sheets-Sheet 1

INVENTOR.
HENRY F. MISEROCCHI
BY
Ervin B. Steinberg
AGENT.

INVENTOR.
HENRY F. MISEROCCHI
BY
Erwin B. Steinberg
AGENT.

United States Patent Office 3,307,266
Patented Mar. 7, 1967

3,307,266
METHOD AND APPARATUS FOR MEASURING THE THICKNESS OF A LAMINAR LAYER
Henry F. Miserocchi, Cos Cob, Conn., assignor, by mesne assignments, to Branson Instruments, Inc., Stamford, Conn., a corporation of Delaware
Filed Mar. 11, 1965, Ser. No. 438,896
12 Claims. (Cl. 33—172)

This invention broadly refers to a method and apparatus for measuring the thickness of a laminar layer on material and has particular reference to the measurement of the thickness of a laminar layer on base material where the laminar layer and the base material have a different surface compliance, such as a different hardness, modulus of elasticity and the like.

The determination of the thickness of a case hardened outer layer on a piece of steel, for instance, involves considerable difficulties. Generally, a section of such material must be cut and polished and subsequently investigated by etching and the use of well-known hardness profile measurement techniques. This known technique, therefore, requires laboratory methods which are generally destructive and laborious, and which are carried out remote from production areas, that is, away from the locations where the items which are to be measured or controlled are actually produced.

The method and apparatus described hereafter refers to a simplified method which omits several of the above stated steps and, moreover, discloses a technique and arrangement which can be used quite readily in situ to measure and determine the thickness of a case hardened layer or the thickness of a laminar layer applied upon a base material, for instance, the thickness of a clad layer on base material. Such an investigation can be performed by employing the principle of a resonant sensing device described in U.S. Patent No. 3,153,338, issued to C. Kleesattel, dated October 20, 1964, and the use of certain techniques and modifications described hereafter. As is shown in this patent, the resonant frequency of a resonating probe under constant force conditions varies with the surface compliance of the material to which the resonating probe is applied. The present invention discloses that varying the force applied to the resonating probe and denoting the shift in resonant frequency as a function of the increasing penetration of the resonating probe into the workpiece under investigation can be used for thickness determination. Since the terminal surface of the laminar layer and the beginning of a different material manifests itself as a significant change in frequency per unit of force, the occurrence of such a significant shift in frequency can be used as a measure of the thickness of the laminar layer. When during the testing cycle the penetration of the resonating probe in the workpiece and the resulting resonant frequency is monitored by a continuous measurement or by plotting a graph, the end of the laminar layer and the beginning of a different material or change in hardness is immediately apparent.

One of the principal objects of this invention is, therefore, the provision of a new and improved method of measuring the thickness of a laminar layer.

Another object of this invention is the provision of a method and apparatus for determining the thickness of a laminar layer on material without requiring the cutting or the special preparation of a test specimen.

Another object of this invention is measuring the thickness of a laminar layer, such as the thickness of a case hardened layer, which measurement can be carried out in situ.

A further object of this invention is the measurement of the thickness of a laminar layer which has a different hardness characteristic than the base material to which this layer is applied, using a resonant sensing device and determining the shift in resonant frequency of this device as a function of forced surface penetration.

A further and other object of this invention is the provision of a method and apparatus for determining the thickness of a laminar layer applied upon a base material, which method and apparatus is characterized by utmost convenience, simplicity, and speed.

Further and still other objects of this invention will be more clearly apparent by reference to the following description when taken in conjunction with the accompanying drawings, in which.

Figure 1:
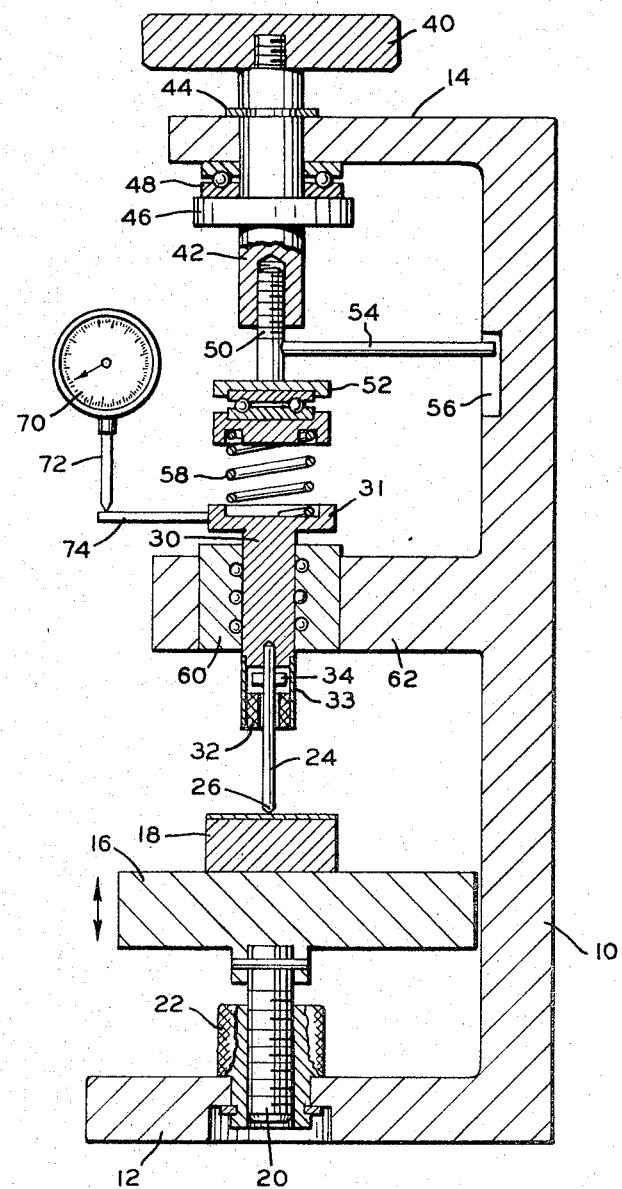
FIGURE 1 is a vertical sectional view, partly schematic, of the mechanical embodiment of the present invention.
Figure 2:
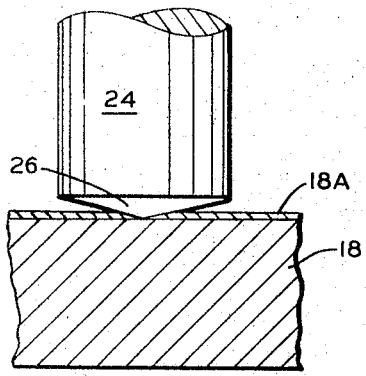
FIGURE 2 is a sectional view, on a greatly enlarged scale, showing the engagement between the diamond tipped probe and the workpiece.

Referring now to the figures and FIGURE 1 in particular, there is shown a support 10 having a base portion 12 and a top portion 14. A work table 16 which supports a workpiece 18 to be tested can be raised or lowered relative to the base portion 12 by means of a knurled knob 22 threadedly engaging a screw 20 disposed between the base portion 12 and the table 16. As shown also in FIGURE 2, the workpiece 18 is provided with a laminar surface layer 18A, the thickness of which is to be determined by the use of a resonating probe 24 which at its lower end is provided with a diamond 26. In the typical instance illustrated here, the layer 18A constitutes a case hardened surface on a piece of steel and thus, layer 18A is harder than the base material 18. The thickness of this layer is to be measured by the probe 24 which is actuated to incrementally penetrate through the layer 18A into the base material of the workpiece 18.

The probe is constructed essentially in accordance with the teachings of the patent identified hereinabove and comprises primarily a slender, elongated rod 24 made of magnetostrictive material. One end of the rod carries a diamond tip, e.g. a Vickers diamond as used in conventional hardness testers, for establishing contact with the workpiece and penetrating into the workpiece. The other probe end is rigidly clamped in a plunger type metal body 30. The magnetostrictive probe is excited to cause longitudinal vibratory motion thereof by means of an electromagnetic induction coil 32 which surrounds the rod but is not fastened thereto. The coil 32 is held in an insulating sleeve 33 which extends from the lower end of the body 30. A piezoelectric feedback transducer 34 is securely fastened to the probe, substantially at a nodal point, and both the electromagnetic coil and the feedback transducer are coupled to an electrical feedback amplifier as described in pending application for U.S. Letters Patent Serial No. 423,214, filed in the name of Norman G. Branson on January 4, 1965, entitled "Control Circuit for Resonant Sensing Device." This circuit will be described also in conjunction with FIGURE 4 hereafter. The amplifier causes the rod to vibrate at a resonant frequency, its value being a direct function of the area contact between the tip 26 and the workpiece.

The forced engagement between the diamond tip 26 and the workpiece 18 is adjustable by the combination of a manually turnable knob 40 which is coupled to a shaft 42, the latter being supported on the top surface of the upper support portion 14 by means of a snap ring 44. The shaft 42 is provided with a flange 46 which supports a thrust bearing 48 so as to provide for the smooth rotation of the shaft 42 in response to the turning of the knob 40.

At the lower end of the shaft 42 there is provided a stud 50, threadedly engaged by the shaft 42, and this stud at its lower end is coupled to a thrust bearing 52. Rotation of the stud 50 is prevented by a pin 54 which extends into a longitudinal slot 56 disposed in the support 10. This construction causes the lower end of the thrust bearing 52 to move in a vertical direction in response to turning the knob 40 and this vertical motion is transferred by means of a helical compression spring 58 upon a flanged top portion 31 of the body 30. The spring 58 is so designed and dimensioned that it exhibits a linear force versus distance characteristic over the limited range of its actual operation. The body 30 retains the probe 24 and, therefore, the force acting upon the probe and causing the engagement between the diamond tip 26 and the workpiece 18 is responsive to the operation of the knob 40. Substantially frictionless vertical motion of the body 30 and the probe 24 is achieved by a linear ball bushing 60 which journals the body 30, and which is mounted from the support 10 by a flanged extension 62.

Additionally, there is provided a dial indicator 70 whose feeler arm 72 is in contact with an extension 74 rigidly coupled to the body 30. The vertical motion of the body and, hence, the motion of the diamond tip 26 relative to the workpiece 18 is indicated on the indicator 70.

Figure 3:
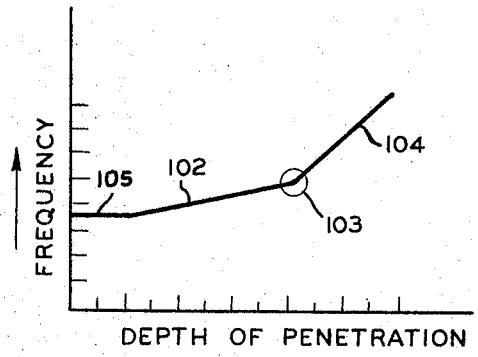
FIGURE 3 is a representation of a typical graph which may be constructed manually or automatically using the apparatus per FIGURE 1.

Operation of this arrangement may be visualized by reference to FIGURE 3.

By means of an electrical circuit which includes the coil 32, the piezoelectric transducer 34 and the mentioned feedback amplifier, the magnetostrictive probe 24 is caused to vibrate at its resonant frequency prior to establishing engagement between the diamond tip 26 and the workpiece. The resonant frequency at which the probe resonates corresponds to the unconstrained condition of the probe and is, as explained in the patent referenced hereinabove, the lowest frequency. When engagement between the diamond tip 26 and the workpiece 18 occurs, the knob 40 is turned in equal increments, for instance, one half or one turn, to apply equal increments of force upon the diamond tip 26, each force increment causing the diamond tip to increasingly penetrate the laminar layer 18A. For each increment of force corresponding to an incremental turning of the knob 40, there is taken a reading of the resonant frequency of the probe and when constructing a plot of frequency versus penetration of the diamond tip as read on the dial indicator 70, a sloping line 102 as seen in FIGURE 3 is obtained. The slope of the line is substantially constant and shows an increase in frequency as a function of tip penetration since the "effective" length of the probe is successively shortened. As the diamond tip 26 penetrates through the laminar layer 18A and reaches the softer base material 18, the same increments of force applied to the rod 24 cause a greater penetration of the tip 26 and, therefore, result in a greater shift in frequency as denoted by the increased slope of the ascending curve 104. Thus, in the area denoted by numeral 103 there is a significant change in the rate of change or shift of resonant frequency with respect to the increments of applied force. The region denoted by numeral 103, therefore, when related to probe penetration as read on dial indicator 70 is a measure of the thickness of the laminar layer 18A. Without change in the hardness of the test piece, equal increments in force would provide equal increments of contact area between the probe and the workpiece and the slope of the curve would continue at the same rate. The curve portion 105 shows constant frequency, the condition prior to establishing contact between the probe and the test piece.

Instead of providing a graph which in view of the readings available from the dial micrometer 70 shows the penetration of the diamond tip 26, it would suffice to plot the resonant frequency resulting from turning the knob 40 in equal increments and as soon as a significant change in the slope of the curve occurs, remove the test specimen and determine the depth of penetration using a depth microscope. Since the possibility exists that the operator fails to discern the change in slope immediately upon its occurrence, too great a depth penetration may occur which then will hinder the precise thickness determination and, therefore, this method is generally not recommended.

Figure 4:
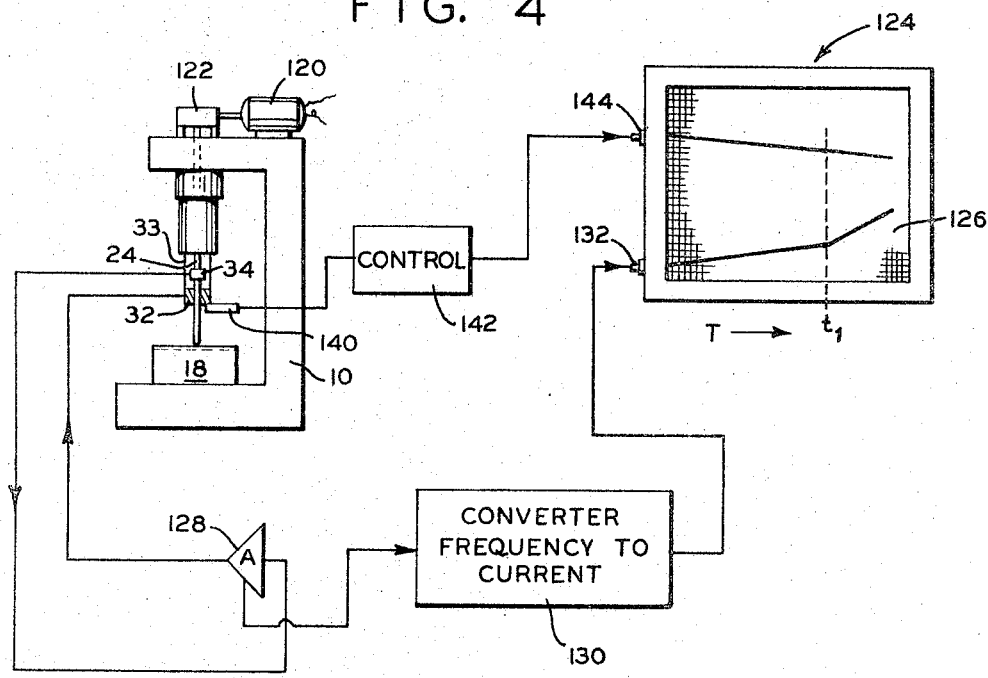
FIGURE 4 is a schematic illustration of a modified arrangement using automatic means for obtaining the desired test data.

An automated process is indicated in FIGURE 4 wherein the engagement force controlling knob 40 is driven by a constant speed motor 120 and a reducing gear mechanism 122. A recorder 124 is provided with a time responsive driven recording medium or a stationary recording medium and time responsive driven styli. As described in FIGURE 1, a feedback amplifier 128 drives the exciting coil 32 associated with the probe 24, to cause the probe to vibrate longitudinally. The piezoelectric crystal 34 provides a feedback signal of such oscillations to the amplifier 128, thereby causing the probe to continuously vibrate at a resonant frequency. A signal corresponding to the resonant frequency of the probe is taken from the amplifier 128 and applied to a frequency to current converter 130 which supplies an output signal, the magnitude of which is responsive to the resonant frequency of the probe. This output signal is fed to one of the input terminals 132 of the recorder 124 to provide a representation of the resonant frequency of the probe 24. Additionally, there is attached to the probe mechanism an electric sensing means 140, such as a differential transformer, which is designed to sense the vertical displacement of the probe in relation to a set zero condition. This sensing means is connected to a control unit 142 which provides an output signal, the amplitude of which is responsive to the linear displacement of the probe. This displacement signal is fed to a further input connection 144 of the recorder unit 124.

The recorder unit 124 and the motor 120 are started substantially simultaneously, thus causing the motor to apply a steadily increasing force upon the probe end in engagement with the workpiece 18. This condition causes the recorder to provide simultaneously a correlated graph of the instantaneous frequency and the linear displacement of the probe.

By selecting the surface of the workpiece as the zero displacement position and the start of the recorder chart, the depth of diamond penetration in the workpiece is read directly without correction. Otherwise, the values up to the point of engagement must be substracted as is apparent in FIGURE 3. As the diamond tip breaks through the hardened surface layer, a significant change in the rate of change of the frequency with respect to force increments is apparent and, as seen at time $t_1$, the rate of change of frequency versus time increases sharply as caused by the increased penetration of the tip. This significant shift in the rate of change of the resonant frequency establishes the end of the laminar layer, the layer thickness being readable on the graph 126. Thus, the lower curve shows the frequency and the upper curve the vertical displacement or amount of penetration of the probe and point $t_1$ is directly relatable to thickness.

While in FIGURE 1 the test instrument is mounted in a support which accommodates a specimen or section of a workpiece which is to be tested, it should be noted that this frame may be readily modified to be a clamp-on device which may be set upon a larger piece of equipment which cannot readily be moved. For instance, by equipping the frame 10 with mounting provisions and providing the lower portion 12 with a suitable opening or cut-out, or eliminating this table-like portion entirely, the entire apparatus can be set upon large equipment for instance, a roller, or an airplane wing, and thickness measurements of laminar layers made in situ, a method not possible with the equipment and method heretofore in use. It will be apparent that in this way the above described method and apparatus provides a significant improvement and advance over the existing art.

Moreover, although the description and illustrations heretofore described assume that the laminar layer is softer than the base material, it will be readily apparent that the method and arrangement operates also with the reverse condition. In this latter case, the resonant frequency exhibits a smaller change per applied force increment as the base material is contacted.

While there has been described and illustrated a certain preferred embodiment of the present invention and certain modifications thereof, it will be apparent to those skilled in the art that various further changes and modifications may be made therein without deviating from the broad principle and intent of the present invention which shall be limited only by the scope of the appended claims.

What is claimed is:

1. Method of measuring the thickness of a laminar layer on material, said layer and material having different surface compliances, comprising:
 applying a mechanical resonating probe having a contact surface to said layer and causing said probe to vibrate at a resonant frequency;
 applying to said probe increasing force to cause said contact surface to increasingly penetrate said layer;
 denoting the shift in resonant frequency of said probe as a function of increasing force, and
 establishing the depth of penetration of said contact surface through said layer into said material upon the occurrence of a significant change in frequency shift.

2. Method of measuring the thickness of a laminar layer on material, said layer and material having different hardness characteristics, comprising:
 applying a mechanical resonating probe having a contact surface to said layer and causing said probe to vibrate at a resonant frequency;
 applying to said probe substantially equal increments of force to cause said contact surface to incrementally penetrate said layer;
 denoting the shift in resonant frequency of said probe as a function of said increments, and
 establishing the depth of penetration of said contact surface through said layer into said material upon the occurrence of a significant change in frequency shift.

3. Method of measuring the thickness of a laminar layer on material, said layer and material having different hardness characteristics, comprising:
 establishing engagement between the layer and a diamond tipped sonically vibrated mechanical probe and causing said probe to vibrate at a resonant frequency;
 applying to said probe increments of force to cause said diamond tip to incrementally penetrate said layer;
 denoting the rate of change of resonant frequency of said probe as a function of said incremental force, and
 establishing the depth of penetration of said diamond tip through said layer into said material upon the occurrence of a significant change in said rate of change.

4. Method of measuring the thickness of a laminar layer as set forth in claim 3 wherein a graph is made of tip penetration versus frequency.

5. Method of measuring the thickness of a laminar layer on material, said layer and material having different hardness characteristics, comprising:
 providing engagement between the material and a mechanical resonating probe having a contact surface and vibrating at a resonant frequency;
 subjecting said probe and material to an engaging force increasing at a uniform rate to cause said contact surface to increasingly penetrate said layer;
 denoting the shift in resonant frequency of said probe as a function of such penetration, and
 establishing the depth of penetration of said contact surface through said layer into said material upon the occurrence of a significant change in frequency shift.

6. Method of measuring the thickness of a laminar layer on material, said layer and material having different hardness characteristics, comprising:
 providing engagement between the material and a mechanical resonating probe having a contact surface and vibrating at a resonant frequency;
 subjecting said probe and material to an engaging force increasing at a uniform rate of change to cause said contact surface to increasingly penetrate said layer;
 denoting the resonant frequency of said probe as said force is changing, whereby said resonant frequency is changing as a function of said force, and
 establishing the depth of penetration of said contact surface through said layer into said material upon the occurrence of a significant change of the rate of change of the resonant frequency.

7. An apparatus for measuring the thickness of a laminar layer on material which has a different surface compliance than said material comprising:
 a mechanical resonating probe having a contact surface;
 electrically energized means coupled to said probe for causing said probe to vibrate at its natural resonant frequency;
 means for holding said contact surface of said probe in steady contact with the layer of material to be measured;
 means for causing increasing engagement force between said contact surface and the layer so as to cause increasing penetration of said contact surface into the layer and thereby obtain a shift in the resonant frequency of said probe;
 means coupled to said probe for indicating the shift of the resonant frequency of said probe as a function of the increasing penetration of said contact surface through the layer, and
 further means coupled to said probe for indicating the amount of penetration by said contact surface.

8. An apparatus for measuring the thickness of a laminar layer on material as set forth in claim 7 wherein said means for indicating includes a means for providing a graph of the rate of change of the frequency as a function of the increasing penetration of said surface.

9. An apparatus for measuring the thickness of a laminar layer on material as set forth in claim 7 wherein said means for indicating includes a means for providing a graph indicative of the rate of change of the frequency as a function of increasing engagement force.

10. An apparatus for measuring the thickness of a laminar layer on material which has a different hardness than said material comprising:
 a support;
 a mechanical resonating probe of magnetostrictive material supported by said support and mounted for motion relative thereto;
 said probe having a contact surface for engaging the layer on a material to be measured;
 electrically energized means coupled to said probe for causing said probe to vibrate at its natural resonant frequency;
 means for holding said contact surface of said probe in steady contact with the layer of material to be measured;
 means disposed between said support and said probe for causing increasing engagement force between said contact surface and the layer so as to cause increasing penetration of said contact surface into the layer and thereby obtain a shift in the resonant frequency of said probe;

electrically operated means coupled to said probe for indicating the shift of resonant frequency of said probe as a function of the increasing penetration of said contact surface through the layer, and for indicating the depth of penetration of said contact surface in the material.

11. An apparatus for measuring the thickness of a laminar layer on material as set forth in claim 10 wherein said means causing increasing force is a resilient biasing means.

12. An apparatus for measuring the thickness of a laminar layer on material as set forth in claim 10 wherein recording means are provided to record the resonant frequency of said probe as the engagement force is increased.

References Cited by the Examiner

UNITED STATES PATENTS 3,153,338  10/1964  Kleesattel _____ 73—67.1

FOREIGN PATENTS 817,631  8/1959  Great Britain.

LEONARD FORMAN, *Primary Examiner.*

S. S. MATTHEWS, *Assistant Examiner.*